United States Patent
Sauerwein et al.

(10) Patent No.: US 9,403,497 B2
(45) Date of Patent: Aug. 2, 2016

(54) TRANSMISSION DEVICES AND METHOD FOR TRANSMITTING AN ELECTRIC CURRENT TO A COMPONENT OF A STEERING WHEEL OF A MOTOR VEHICLE

(75) Inventors: Thomas Sauerwein, Großwallstadt (DE); Uwe Speck, Aschaffenburg (DE); Jürgen Bender, Frankfurt (DE); Markus Stollberg, Hösbach (DE); Michael Bischoff, Rottenberg (DE)

(73) Assignee: TAKATA-PETRI AG (DE)

( * ) Notice: Subject to any disclaimer, the term of this patent is extended or adjusted under 35 U.S.C. 154(b) by 740 days.

(21) Appl. No.: 13/224,918

(22) Filed: Sep. 2, 2011

(65) Prior Publication Data
US 2012/0286580 A1    Nov. 15, 2012

(30) Foreign Application Priority Data

May 10, 2011    (DE) .......................... 10 2011 075 593

(51) Int. Cl.
| | |
|---|---|
| *B60L 1/00* | (2006.01) |
| *B60L 3/00* | (2006.01) |
| *H02G 3/00* | (2006.01) |
| *B60R 16/027* | (2006.01) |
| *G01K 13/00* | (2006.01) |
| *H01R 35/02* | (2006.01) |

(52) U.S. Cl.
CPC .............. *B60R 16/027* (2013.01); *G01K 13/00* (2013.01); *H01R 35/025* (2013.01)

(58) Field of Classification Search
USPC ........... 307/10.1, 11, 12, 51, 52; 431/15, 164, 431/621, 622
See application file for complete search history.

(56) References Cited

U.S. PATENT DOCUMENTS

| | | | |
|---|---|---|---|
| 3,347,098 A | 10/1967 | Bielstein et al. | |
| 4,083,001 A | 4/1978 | Paice | |
| 5,102,061 A | 4/1992 | Suzuki et al. | |

(Continued)

FOREIGN PATENT DOCUMENTS

| | | |
|---|---|---|
| DE | 569 516 A | 1/1933 |
| DE | 41 11 699 C2 | 2/1992 |

(Continued)

OTHER PUBLICATIONS

European Search Report issued in counterpart European Application No. 12165688.8 dated Aug. 17, 2012 (4 pages).

(Continued)

*Primary Examiner* — Rexford Barnie
*Assistant Examiner* — Xuan Ly
(74) *Attorney, Agent, or Firm* — Fitch Even Tabin & Flannery LLP

(57) ABSTRACT

In one form, the invention relates to a transmission device for transmitting an electric current to a component of a steering wheel of a motor vehicle, including a rotor which is to be arranged on the steering wheel such that it is rotatable along with the steering wheel; a stator which is to be arranged on a component of the vehicle that is stationary as compared to a rotary movement of the steering wheel; at least one conductor element by which the rotor is electrically connected with the stator; and a temperature determination device for determining the temperature of the conductor element or in the region of the conductor element. In another form, the invention also relates to a method for transmitting an electric current to a component of a steering wheel of a motor vehicle.

19 Claims, 5 Drawing Sheets

(56) References Cited

U.S. PATENT DOCUMENTS

| | | | |
|---|---|---|---|
| 6,007,355 A | 12/1999 | Shibata et al. | |
| 6,299,466 B1 | 10/2001 | Bolen et al. | |
| 6,736,645 B2 | 5/2004 | Kato et al. | |
| 6,736,657 B2 | 5/2004 | Bonn | |
| 6,949,945 B2 | 9/2005 | Klein | |
| 7,339,773 B2* | 3/2008 | Gergintschew | 361/58 |
| 2002/0094700 A1* | 7/2002 | Kato | H01R 35/025 439/15 |
| 2003/0034793 A1* | 2/2003 | Lee | G01R 31/346 324/765.01 |
| 2009/0305519 A1 | 12/2009 | Tarasinski | |

FOREIGN PATENT DOCUMENTS

| | | |
|---|---|---|
| DE | 4130978 A1 | 4/1993 |
| DE | 195 25 928 C2 | 1/1997 |
| DE | 19740224 A1 | 3/1998 |
| DE | 10057793 A1 | 7/2001 |
| DE | 101 19 201 A1 | 10/2002 |
| DE | 602 00 061 T2 | 7/2004 |
| DE | 102004002360 A1 * | 8/2005 |
| DE | 10 2005 019 362 A1 | 11/2006 |
| DE | 10 2008 030 730 A1 | 12/2009 |
| EP | 1225098 A1 | 7/2002 |
| EP | 1 257 438 B2 | 10/2005 |
| EP | 1877268 B1 | 9/2010 |
| EP | 2 325 055 A2 | 5/2011 |
| EP | 2325055 A2 | 5/2011 |
| GB | 2 317 756 A | 4/1998 |

OTHER PUBLICATIONS

English translation of Notification of First Office Action issued in corresponding Chinese Application No. 201210140234.7, dated Feb. 25, 2014 (13 pages).

* cited by examiner

TRANSMISSION DEVICES AND METHOD FOR TRANSMITTING AN ELECTRIC CURRENT TO A COMPONENT OF A STEERING WHEEL OF A MOTOR VEHICLE

CROSS-REFERENCE TO RELATED APPLICATION

This application claims priority under 35 U.S.C. §119 to German Patent Application No. 10 2011 075 593.4 filed on May 10, 2011, the entire content of which is hereby incorporated herein by reference in its entirety.

FIELD OF THE INVENTION

This invention relates to a transmission device for transmitting an electric current to a component of a steering wheel of a motor vehicle according to claim 1, a transmission device according to claim 11, and a method for transmitting an electric current to a steering wheel component according to claim 12.

BACKGROUND

From the prior art; transmission devices are known with which in particular electric or electronic components (e.g. a control unit and/or a power source) stationarily arranged on a vehicle body are electrically connected with components of a steering wheel, which move along with the rotation of the steering wheel. In particular, with such a transmission device, electric or electronic components (e.g. an ignition unit of an airbag module, an electric motor of a superposition drive and/or electric switches) arranged on the steering wheel are supplied with current. An example for such a transmission device is described in DE 411 699.

SUMMARY

The problem underlying the present invention consists in creating a transmission device and a method with which a rather safe transmission of an electric current to a component arranged in a steering wheel becomes possible.

This problem is solved by the transmission device with the features according to claim 1 and claim 11, and by the method with the features according to claim 12. Developments of the invention are indicated in the dependent claims.

Accordingly there is provided a transmission device for transmitting an electric current to a component of a steering wheel of a motor vehicle, comprising
- a rotor which is to be arranged on the steering wheel such that it is rotatable along with the steering wheel;
- a stator which is to be arranged on a component of the vehicle that is stationary as compared to a rotary movement of the steering wheel;
- at least one conductor element by which the rotor is electrically connected with the stator; and
- a temperature determination device for determining the temperature of the conductor element or in the region of the conductor element.

The rotor—based on the mounted condition of the transmission device—in particular is fixed on the steering wheel, so that when the steering wheel rotates, it rotates with the same about the steering axle of the steering wheel. The stator, on the other hand, is fixed on a stationary assembly of the vehicle, so that it does not rotate along with a rotation of the steering wheel; for example, the stator is attached to a steering-column shroud of the vehicle.

The conductor element in particular is a conductor tape, i.e. a flat, flexible substrate on which at least one conductor path is arranged (e.g. printed). In particular, a plurality of conductor paths will be arranged on the flexible substrate, i.e. also on its front and rear side. A transmission device with a stator and a rotor, which are connected with each other by such flexible conductor path, are described e.g. in EP 1 257 438 B1, to which reference is made here expressly. It is of course also possible that other kinds of conductor elements are used, e.g. a conductor wire or a plurality of separate wires.

The temperature determination device comprises at least one temperature sensor which is arranged e.g. on the conductor element. For example, a thermocouple is used as temperature sensor, which is fixed at the conductor element, e.g. bonded to the conductor element. As temperature sensor, other types of sensor can of course also be used, e.g. resistance elements or heat sensors with a quartz oscillator. The invention is of course not limited to a certain type of temperature sensors, but in principle any type of temperature sensors can be used, for example non-contact sensors such as e.g. fiber-optical temperature sensors.

In particular, at least one temperature sensor of the temperature determination device is arranged at a rotor-side end of the conductor element and/or at least one temperature sensor is arranged at a stator-side end of the conductor element. If the conductor element is formed as conductor tape, a transition element (e.g. in the form of a stamped sheet) can be provided at the rotor-side end and/or at the stator-side end of the conductor tape, via which the conductor tape is connected with a plug element. The temperature sensor (or the plurality of temperature sensors) can be arranged (in particular fixed) on the conductor tape at the transition element itself or in the region of the transition element. In addition, it is conceivable that at least one temperature sensor is arranged on the rotor and/or at least one temperature sensor is arranged on the stator.

The conductor element in particular can be wound up, for which purpose the rotor for example forms a winding surface onto which the conductor element can be wound (reeled) up. The temperature sensor (or the plurality of temperature sensors) in particular is/are arranged such that a temperature of the conductor tape can be determined both for the case that the conductor element at least approximately is completely wound up on the winding surface of the rotor, and for the case that the conductor element is completely unwound from the winding surface of the rotor and e.g. rests against a surface of the stator. For this purpose, for example, at least one temperature sensor is arranged on the rotor and at least one temperature sensor is arranged on the stator.

In accordance with a further aspect of the invention, the transmission device comprises a monitoring device for determining a current intensity of a current flowing through the conductor element, a voltage drop via the conductor element and/or a power loss occurring during power transmission via the transmission device.

In particular, it is conceivable that the temperature determination device is formed to determine the temperature of the conductor element with reference to information of the monitoring device concerning the determined current intensity, the voltage and/or the power loss by using a (numerical) temperature model for the transmission device. This means that the temperature determination is effected indirectly with reference to the measured current (i.e. the measured current intensity), the voltage and/or the power loss. In particular, such temperature determination can also be effected without the use of a temperature sensor. The current intensity, the voltage drop and/or the power loss can of course also be determined in addition to a direct temperature measurement.

In addition, the transmission device can include a control unit which in dependence on the determined temperature of the conductor element, the current intensity of a current flowing through the conductor element, the voltage drop via the conductor element and/or the power loss controls a current through the conductor element. For example, this control unit is formed such that it can be integrated into the steering wheel of the vehicle.

Furthermore, the control unit can be formed to reduce or interrupt a current through the conductor element upon exceedance of a specifiable limit value of the temperature. By means of this measure it is possible to counteract a destruction of the conductor element by too high temperatures. Reducing or interrupting the current for example can be effected in that the control unit sends a corresponding control signal to at least some of the components (loads) in the steering wheel, which are supplied via the transmission device. For this purpose, the control unit is connected with the load in the steering wheel in particular via a bus system (e.g. in the form of a local interconnect network (LIN) or a controller area network (CAN). It is also possible that the control unit controls a switch with which the flow of current through the conductor element can be interrupted.

Furthermore, it is conceivable that the control unit extrapolates a certain time profile of the temperature by using a temperature model of the transmission device, so that it can be determined, for example, whether the temperature will exceed an admissible maximum temperature, and if yes, at what time this will occur. For example, the control unit is formed such that it reduces or interrupts the flow of a current flowing through the conductor element, when the extrapolated temperature profile exceeds a specifiable limit value. In other words, the control unit determines the future temperature profile and reduces the current flowing through the conductor element when the future temperature profile will exceed the specified limit value (e.g. within a specifiable period).

It is also conceivable that parameters of the temperature model are determined by using a measured value for a current intensity of a current flowing through the conductor element, a measured value for a voltage drop via the conductor element and/or a measured value for a power loss of a current flowing through the conductor element, and thus a temperature profile for the conductor element is simulated. Should this simulated temperature profile exceed a specifiable limit value, the control unit might reduce or interrupt the current via the transmission device.

In a second aspect, the invention relates to a transmission device for transmitting an electric current to a component of a steering wheel of a motor vehicle, comprising
  a rotor which is to be arranged on the steering wheel such that it is rotatable along with the steering wheel;
  a stator which is to be arranged on a component of the vehicle that is stationary as compared to a rotary movement of the steering wheel;
  at least one conductor element by which the rotor is electrically connected with the stator; and
  a voltage determination means for determining a voltage drop via at least one portion of the conductor element.

The voltage determination means in particular serves to detect a disturbance of the conductor element (e.g. a conductor break). Furthermore, a control unit can be present, which controls the current via the conductor element in dependence on the voltage determined by means of the voltage determination means; e.g. reduces or interrupts the current, when the voltage measured by the voltage determination means indicates a damage of the conductor element.

The transmission device also can include a temperature determination device as described above for determining the temperature of the conductor element or in the region of the conductor element, so that the determination of the voltage drop can be combined with the temperature measurement. In particular, the controller is formed to control a current through the conductor element in dependence on the temperature determined by the temperature determination device and/or the voltage determined by the voltage determination means.

The voltage determination means e.g. is formed to determine a voltage drop via a first portion of the conductor element, via which current is supplied to the component in the steering wheel, and/or a voltage drop via a second portion of the conductor element, via which current is dissipated from the component in the steering wheel. In particular, the first portion of the conductor element extends from an input terminal to an output which is connected with the component. The second portion of the conductor element extends e.g. between an input terminal of the conductor element connected with the component and an output. For example, the component is a control means with which e.g. further electronic or electric components ("loads") of the steering wheel are connected.

The control unit which controls the current through the conductor element can be designed such that it compares the voltage drop measured via the first and the second portion of the conductor element with each other and for example reduces or interrupts the current through the conductor element when the measured values for the voltage drop are different, e.g. a defect of the first (current-supplying) portion of the conductor element can be detected when the voltage drop via the first portion is greater than the voltage drop via the second (current-dissipating) portion.

The invention also relates to a steering wheel with a transmission device formed as described above.

Furthermore, the invention relates to a method for transmitting the electric current to a component of a steering wheel of a motor vehicle, in particular by using a device as described above, with the following steps:
  providing a rotor which is to be arranged on the steering wheel such that it is rotatable along with the steering wheel;
  providing a stator which is to be arranged on a component of the vehicle that is stationary as compared to a rotary movement of the steering wheel;
  providing at least one conductor element by which the rotor is electrically connected with the stator; and
  determining the temperature of the conductor element.

In particular, as already mentioned above, a time profile of the temperature of the conductor element can be simulated by using a temperature model or be determined by extrapolating a measured temperature profile, wherein the temperature profile determined in this way is compared with a specified limit value of the temperature and a current through the conductor element is reduced or interrupted, if the temperature profile exceeds the limit value.

Alternatively or in addition, it is also conceivable that a spatial temperature extrapolation is made, i.e. proceeding from a known temperature at a first portion of the transmission arrangement, a temperature for a second portion of the transmission arrangement spaced from the first portion is determined by using a temperature model for the transmission device. The first and/or the second portion for example are portions of the conductor element. In this way it is possible, for example, that a temperature sensor is mounted not directly on the conductor element, but with a distance to the same, and a determination of the temperature of the conductor element nevertheless can be made.

BRIEF DESCRIPTION OF THE DRAWINGS

The invention will subsequently be explained in detail by means of exemplary embodiments with reference to the Figures, in which.

DETAILED DESCRIPTION OF THE PREFERRED EMBODIMENTS

Figure 1:
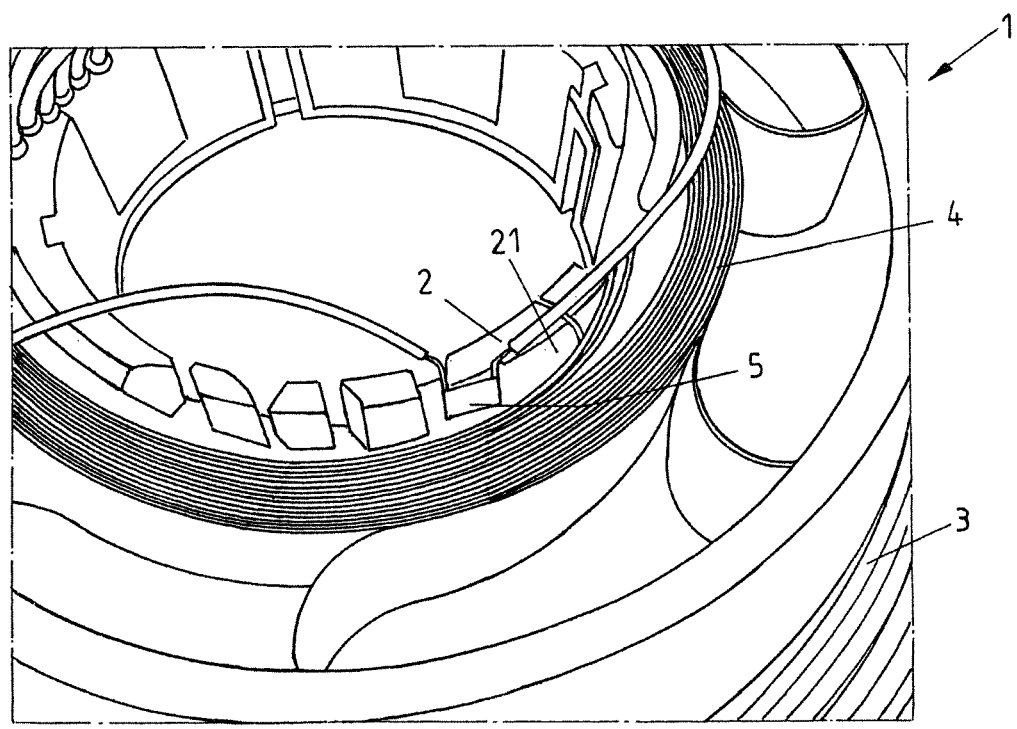
FIG. 1 shows a transmission device according to an exemplary embodiment of the invention.

The transmission device 1 (contact unit) according to the invention as shown in FIG. 1 includes a rotor 2 to be attached to a steering wheel (not shown), which is electrically connected with a stator 3 via a conductor element in the form of a flexible and flat conductor tape 4. The stator 3 is to be fixed on a stationary component (not shown) of the vehicle, so that in contrast to the rotor 2 it will not rotate with a rotation of the steering wheel. The conductor tape 4 can be wound up on a winding surface 21 of the rotor, wherein FIG. 1 shows the conductor tape 4 in a condition in which it is almost completely wound up on the winding surface 21.

Furthermore, the transmission device 1 comprises a temperature determination device which includes a temperature sensor 5 (e.g. in the form of a resistance element or a thermocouple). In the illustrated example, the temperature sensor 5 is attached to the rotor 2 and in particular serves to determine the temperature (at least of a region) of the conductor tape 4 in its wound condition. In FIG. 1, the electric leads to the temperature sensor 5 only are shown schematically. It is of course possible that the leads extend in some other way; for example, the electric connection of the temperature sensor 5 might also be made via a conductor path of the conductor tape 4.

In addition, it is also conceivable that the temperature determination device comprises further temperature sensors; for example, at least one temperature sensor can also be arranged on the stator 3, so that the temperature of the conductor tape 4 can also be determined when the same is completely unwound from the winding surface 21 and e.g. rests against a surface of the stator 3.

The transmission device in particular also includes a monitoring device for determining the current intensity of a current flowing through the conductor element 4, wherein for example the current intensity of a current flowing through one of the conductor paths of the conductor tape is measured. It is of course also conceivable that the monitoring device is formed to determine the current intensity of the currents flowing through some or all of the conductor paths of the conductor tape. Furthermore, the monitoring device can be provided to determine a voltage drop across the conductor tape and/or a power loss obtained during the transmission of energy via the conductor tape.

The monitoring device in particular is formed as electronic circuit which for example is (at least partly) positioned on or in the steering wheel or arranged on the rotor and/or the stator. It is also conceivable that the rotor and/or the stator forms a housing of the transmission device and the electronic circuit is placed inside this housing.

The transmission device 1 also can include a control unit (e.g. in the form of an electronic circuit in the manner of an "Electronic Control Unit" (ECU), which controls the current through the conductor tape (or through only some of the conductor paths of the conductor tapes) in dependence on the temperature of the conductor element, the current intensity of the current flowing through the conductor element, the voltage drop via the conductor tape and/or the power loss.

Like the monitoring device, the control unit for example can be arranged on the rotor and/or the stator or at some other point in the steering wheel. It is also conceivable that the monitoring device and the control unit are provided in the form of a common electronic component. It is of course also possible that the control unit is not arranged in the steering wheel, but (e.g. together with the onboard electronics) at some other point in the vehicle.

The control unit in particular also is designed such that by using the temperature measured by means of the sensor 5 and e.g. further characteristics such as the above-mentioned power loss or the current flowing through the conductor tape or the voltage drop occurring via the conductor element, it simulates or extrapolates a time profile of the temperature of the conductor tape. In particular, the control unit arranges for a reduction or interruption of the current through the conductor tape, when the simulated or extrapolated profile exceeds a specifiable limit value. It is of course also conceivable that the control unit reduces or interrupts the current through the conductor element without simulation or extrapolation of a temperature profile, when the temperature measured by means of the sensor exceeds a limit value.

Figure 2:
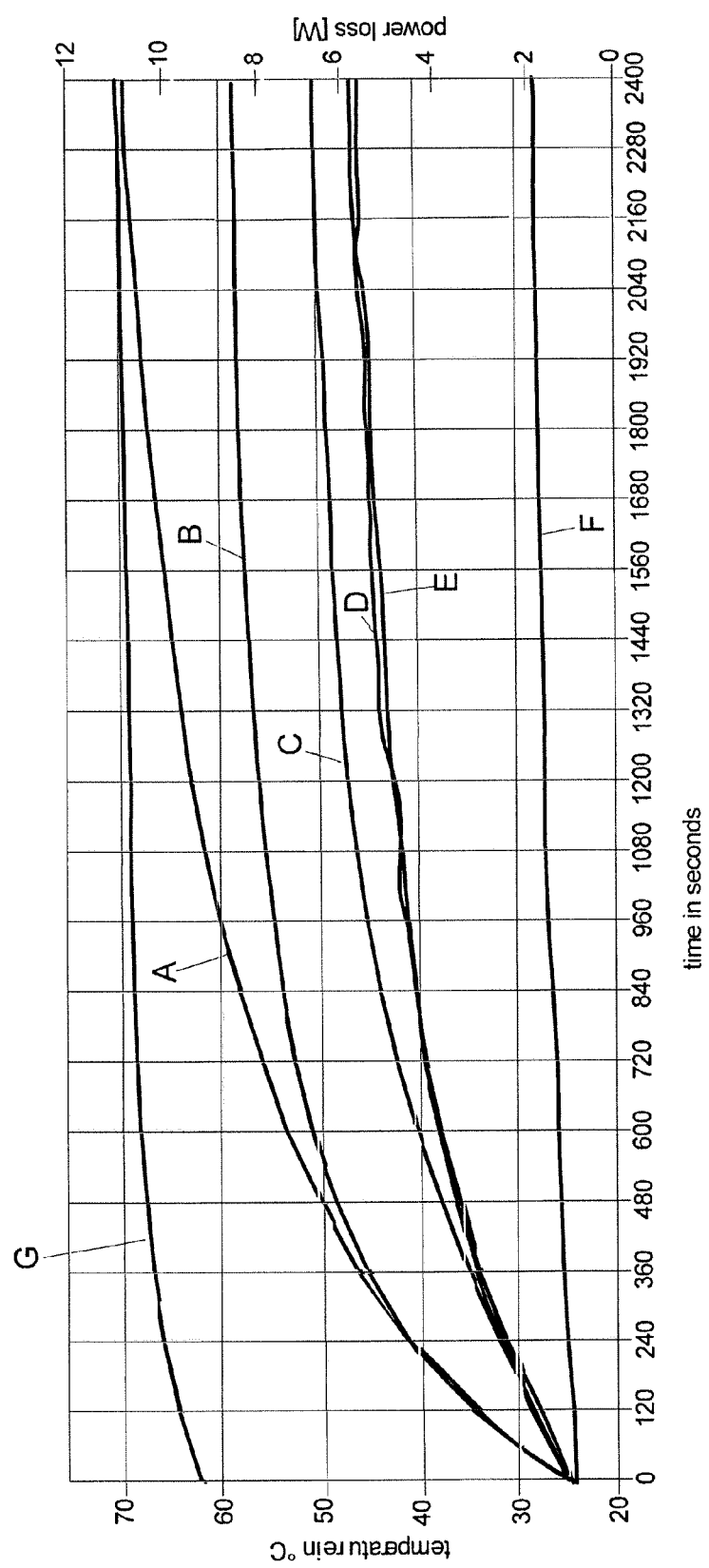
FIG. 2 shows the profile of the temperature at different points of the transmission device and the time profile of the power loss.

FIG. 2 shows different temperature profiles which were measured with temperature sensors arranged at different positions of the transmission device. Curve A relates to the temperature determined by means of a temperature sensor arranged in the region of the rotor, whereas curve B relates to a temperature which was measured with a sensor arranged in the region of the stator. Further sensors were disposed in the air-filled volume within the rotor (curve C), between rotor and stator (curve D), on the outside on a cover of the transmission device (e.g. formed by the rotor or the stator) (curve E), and on the outside and at a distance to the transmission device (curve F).

Furthermore, FIG. 2 shows the power loss occurring during the transport of current through the conductor tape (curve G), wherein the conductor tape had a cross-sectional area of 2×1.73 mm$^2$ and a current with a current intensity of 20 A was transmitted via the conductor tape.

Figure 3:
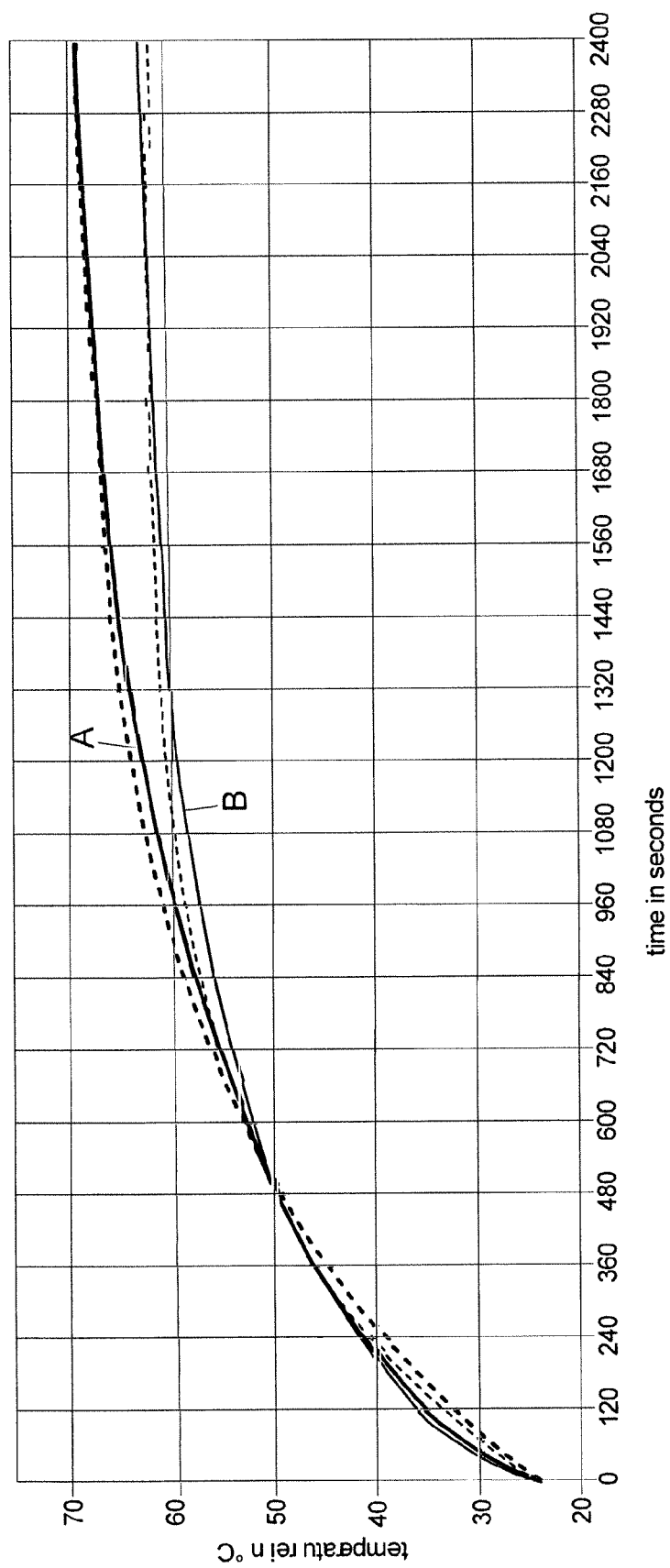
FIG. 3 shows measured temperature profiles as compared with calculated temperature profiles.

FIG. 3 shows the temperature profile according to curves A and B of FIG. 2 (continuous lines). In addition, a numerical temperature model was developed for the transmission device, with which the time profile of the temperature in the conductor tape can be calculated (broken lines). As mentioned above, measured electrical characteristics such as the current intensity, the voltage drop and/or the power loss can be included in the model. It is also conceivable that the measured temperature profile is included in the model, wherein parameters of the model can be adapted (fitted) to the measured temperature profile, in order to extrapolate the measured temperature profile.

Hence it is possible, for example, to infer a later temperature profile or a temperature at a later date on the basis of a temperature profile determined for a certain period. In particular, the extrapolated or simulated temperature profile can also be used to check whether the temperature in the conductor tape will exceed a specifiable temperature limit value at a later date. In this case, the control unit might interrupt or at least reduce the flow of current through the conductor tape, in particular when the exceedance of the limit value will occur within a likewise specifiable period after putting the transmission device into operation, in order to prevent a destruction of the conductor tape due to high temperature.

Figure 4:
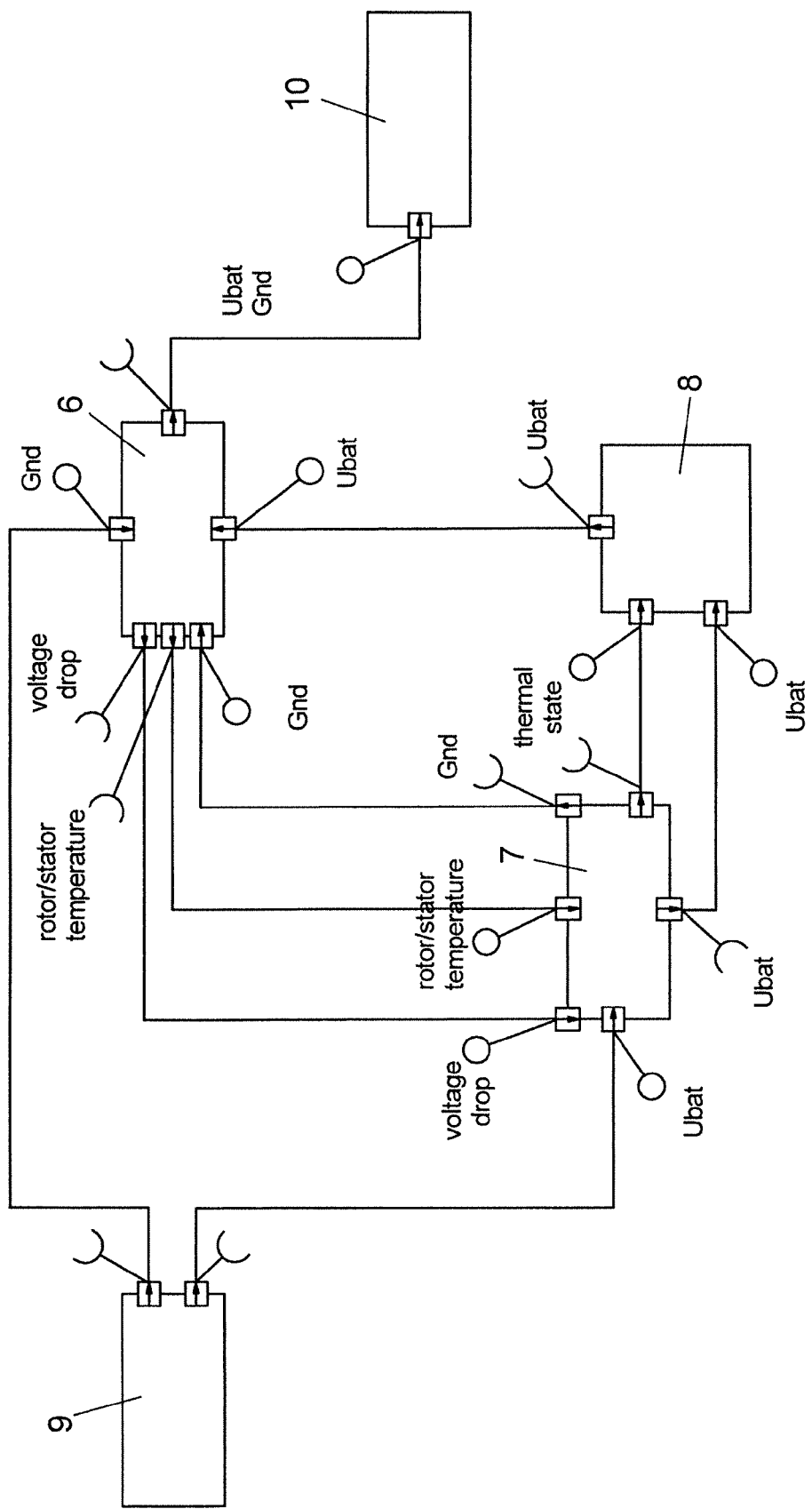
FIG. 4 shows a block circuit diagram of a transmission device according to the invention.

In FIG. 4, an exemplary embodiment of the transmission device is shown in a block circuit diagram. Accordingly, a unit 6 of rotor, stator, conductor tape, temperature determination device (with output "rotor-stator temperature") and a monitoring means (with output "voltage drop") for determining a voltage drop is connected with a control unit 7 via the conductor tape.

As described above, the control unit 7 is formed to inhibit a current flow through the conductor tape in dependence on the input variables "temperature at the conductor tape" and "voltage drop via the conductor tape". For this purpose, the control unit 7 is connected with a switch 8 which in response to a control signal of the control unit 7 switches into the off-position in which it interrupts the current flow via the conductor tape.

The unit 6 and the control unit 7 are connected with a power source 9 of the vehicle. Via the conductor tape, the control unit 7 can also send control signals to a further control unit 10 accommodated in the steering wheel ("steering-wheel ECU"), in order to arrange for a reduction of the power consumption of components present in the steering wheel and controlled via the ECU 10. For example, the ECU 10 will switch off individual electric or electronic components of the steering wheel in response to a corresponding control signal of the control unit 7. It is also possible that the control unit 7 and the ECU 10 are combined to a common unit.

Figure 5:
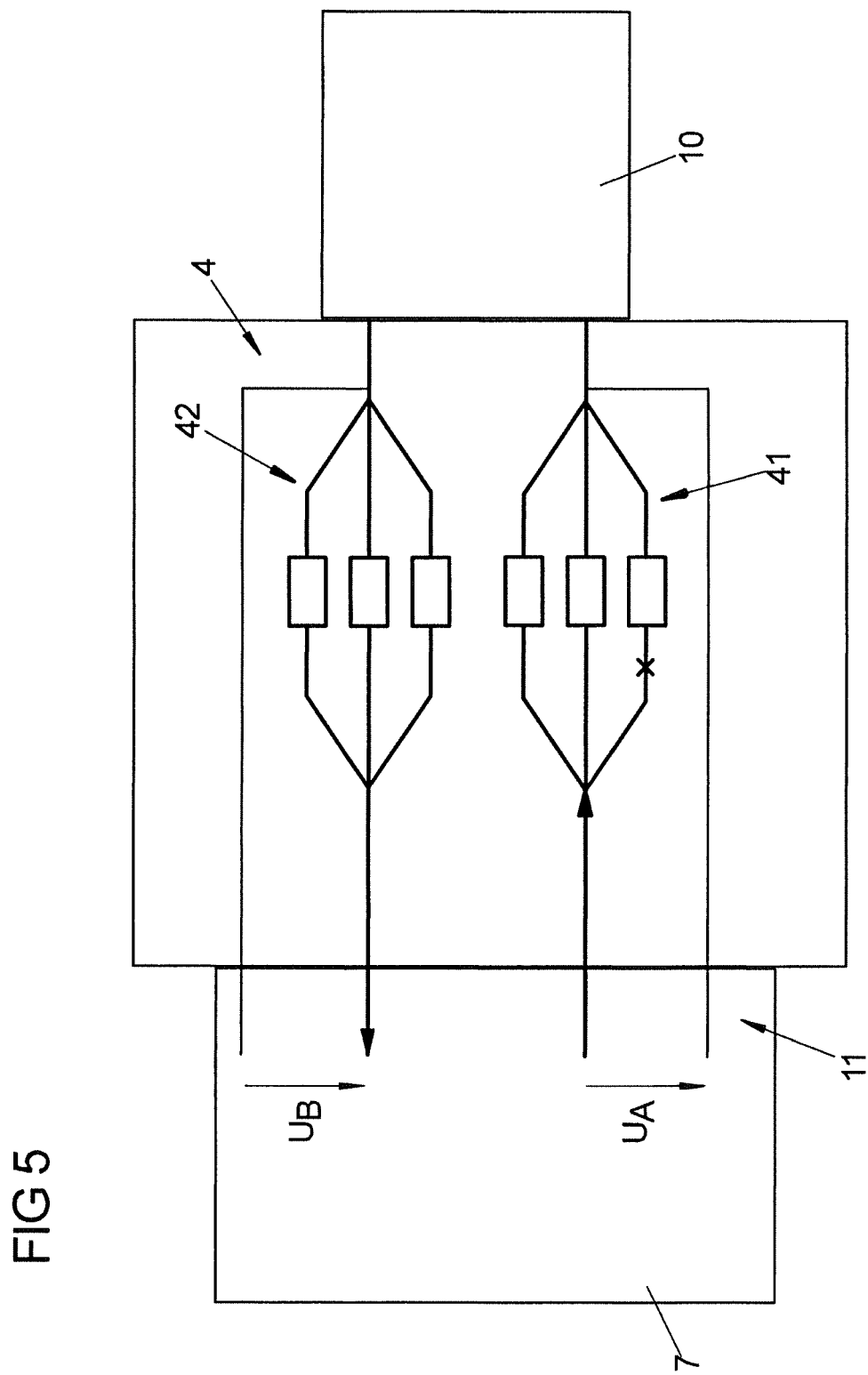
FIG. 5 schematically shows a transmission device according to the invention with a voltage determination means.

FIG. 5 schematically shows a transmission device according to the invention, which is provided with a voltage determination means 11 for determining a voltage drop $U_A$ via a first portion 41 of the conductor element formed as conductor tape 4 (flat conductor) and a voltage drop $U_B$ via a second portion 42 of the conductor tape 4.

Via the first portion 41 of the conductor tape 4 current is supplied to a component in the form of a control means 10 (steering-wheel ECU) (current direction indicated by arrow in a supplying conductor), and via the second portion 42 current is dissipated from the control means 10 (current direction indicated by arrow in a dissipating conductor). The first portion 41 for example extends from an input terminal to an output of the conductor tape 4 connected with the control means 10, and the second portion 42 extends from an input connected with the control means 10 to an output terminal of the conductor tape 4. For example, both portions 41, 42 extend between a first and a second plug terminal of the conductor tape 4.

The transmission means in addition includes a control unit 7 which in dependence on the voltages measured by means of the voltage determination means 11 via the first and the second portion 41, 42 controls a current through the conductor tape 4. For example, the control unit 7 is formed such that it reduces or interrupts the current through the conductor tape, when the voltage drop $U_A$, $U_B$ via the first or the second portion 41, 42 exceeds a specifiable limit value, wherein the limit value is chosen such that a voltage drop which exceeds the limit value indicates a defect (indicated by a cross in the first portion 41 of the conductor tape 4) of at least a partial region of the conductor tape.

It is also conceivable that the control unit 7 compares the voltage drop $U_A$ via the first portion 41 with the voltage drop $U_B$ via the second portion 42 and reduces or interrupts the current through the conductor tape 4, if the voltage drop $U_A$ differs from the voltage drop $U_B$, e.g. due to the defect in the first portion 41 the voltage $U_A$ will be greater than the voltage $U_B$. For example, the voltage drop $U_B$ via the non-defective second portion 42 is 150 mV at a current intensity of 10 A, whereas the voltage drop via the damaged first portion 41 is e.g. more than 200 mV.

The transmission means of FIG. 5 can of course be combined with a temperature determination device as shown e.g. in FIGS. 1 and 4, wherein the control unit 7 in particular is formed to control the current through the conductor tape 4 in dependence on the temperature determined with the temperature determination device and/or the voltage determined by the voltage determination means (i.e. the voltage drops $U_B$ or $U_A$).

The invention claimed is:

1. A transmission device for transmitting an electric current to at least one component of a steering wheel of a motor vehicle, comprising:
   a rotor which is to be arranged on the steering wheel such that it is rotatable along with the steering wheel;
   a stator which is to be arranged on a component of the vehicle that is stationary as compared to a rotary movement of the steering wheel;
   at least one conductor element by which the rotor is electrically connected with the stator; and
   a voltage determination means for determining a voltage drop via at least one portion of the conductor element,
   wherein the voltage determination means is configured to determine a first voltage drop across a first portion of the conductor element, via which current can be supplied to the component in the steering wheel, and a second voltage drop across a second portion of the conductor element, via which current can be conveyed away from the component in the steering wheel,
   wherein the transmission device comprises a control means configured to compare the first and second voltage drops across the respective first and the second portions of the conductor element with one another and to reduce or interrupt the current through the conductor element if the measured values of the voltage drops are different.

2. The transmission device according to claim 1, characterized in that a temperature determination device comprises at least one temperature sensor arranged on the conductor element wherein the control means uses the determined temperature of the conductor element by the temperature determination device or the comparison of the voltage drops for reducing or interrupting the current through the conductor element.

3. The transmission device according to claim 2, characterized in that at least one temperature sensor is arranged at a rotor-side end of the conductor element and/or at least one temperature sensor is arranged at a stator-side end of the conductor element.

4. The transmission device according to claim 2, characterized in that at least one temperature sensor is arranged on the rotor and/or at least one temperature sensor is arranged on the stator.

5. The transmission device according to claim 1, wherein the control means, in addition to the comparison of the voltage drops, also is configured to use a determined temperature of the conductor element, the current intensity of a current flowing through the conductor element, the voltage drop via the conductor element and/or the power loss for controlling a current through the conductor element.

6. The transmission device according to claim 5, characterized in that upon exceedance of a specifiable limit value of the temperature the control means reduces or interrupts a current through the conductor element.

7. The transmission device according to claim 5, characterized in that a temperature determination device determines a time profile of the temperature of the conductor element and the control means extrapolates the temperature profile and reduces or interrupts a current through the conductor element, when the extrapolated profile of the temperature exceeds a specifiable limit value.

8. The transmission device according to claim 5, characterized by a bus system via which the control means can be connected with the component of the steering wheel to be supplied with current via the transmission device.

9. The transmission device according to claim 1, characterized in that the conductor element comprises a flexible substrate on which at least one conductor path is arranged.

10. The transmission device according to claim 3, characterized in that at least one temperature sensor is arranged on the rotor and/or at least one temperature sensor is arranged on the stator.

11. The transmission device according to claim 6, characterized in that the temperature determination device determines a time profile of the temperature of the conductor element and the control means extrapolates the temperature profile and reduces or interrupts a current through the conductor element, when the extrapolated profile of the temperature exceeds a specifiable limit value.

12. The transmission device according to claim 6, characterized by a bus system via which the control means can be connected with the component of the steering wheel to be supplied with current via the transmission device.

13. The transmission device according to claim 7, characterized by a bus system via which the control means can be connected with the component of the steering wheel to be supplied with current via the transmission device.

14. A method for transmitting an electric current to a component of a steering wheel of a motor vehicle, with the following steps:
provided a rotor which is to be arranged on the steering wheel such that it is rotatable along with the steering wheel;
providing a stator which is to be arranged on a component of the vehicle that is stationary as compared to a rotary movement of the steering wheel;
providing at least one conductor element by which the rotor is electrically connected with the stator;
determining the temperature of the conductor element or in the region of the conductor element; and
providing a voltage determination means for determining a voltage drop via at least one portion of the conductor element,
wherein the voltage determination means is configured to determine a first voltage drop across a first portion of the conductor element, via which current can be supplied to the component in the steering wheel, and a second voltage drop across a second portion of the conductor element, via which current can be conveyed away from the component in the steering wheel,
wherein the transmission device comprises a control means configured to compare the first and second voltage drops across the respective first and the second portions of the conductor element with one another and to reduce or interrupt the current through the conductor element if the measured values of the voltage drops are different.

15. The method according to claim 14, characterized in that a time profile of the temperature is determined and extrapolated;
the extrapolated temperature profile is compared with a specified limit value of the temperature;
a current through the conductor element is reduced or interrupted, if the extrapolated temperature profile exceeds the specifiable limit value.

16. The method according to claim 15, characterized in that a current intensity of a current flowing through the conductor element, a voltage drop via the conductor element and/or a power loss is determined and the extrapolation of the temperature profile is effected in dependence on at least one of these variables.

17. The method according to claim 14, characterized in that a temperature is determined for a first portion of the transmission arrangement and by using a temperature model a temperature is determined for a second portion of the transmission arrangement.

18. The method according to claim 15, characterized in that a temperature is determined for a first portion of the transmission arrangement and by using a temperature model a temperature is determined for a second portion of the transmission arrangement.

19. The method according to claim 16, characterized in that a temperature is determined for a first portion of the transmission arrangement and by using a temperature model a temperature is determined for a second portion of the transmission arrangement.

* * * * *